Sept. 18, 1951         A. N. NILSON ET AL                2,568,249
                        LATCH OPERATED CLUTCH
Filed Nov. 1, 1946                                  2 Sheets-Sheet 2
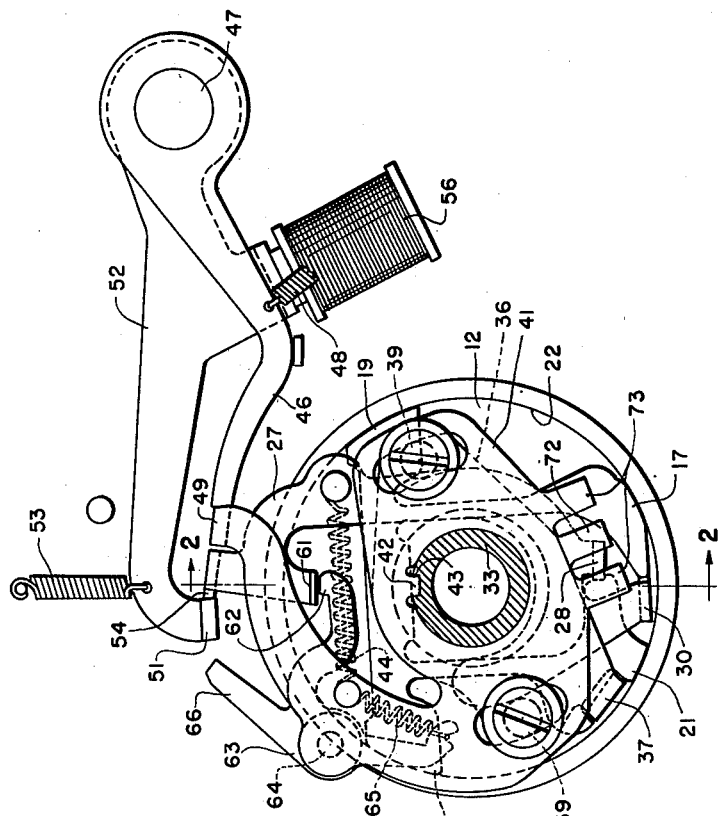
INVENTORS
ARTHUR N. NILSON
ROLF A. THIENEMANN
WALTER J. ZENNER
BY Emery Robinson
ATTORNEY Patented Sept. 18, 1951

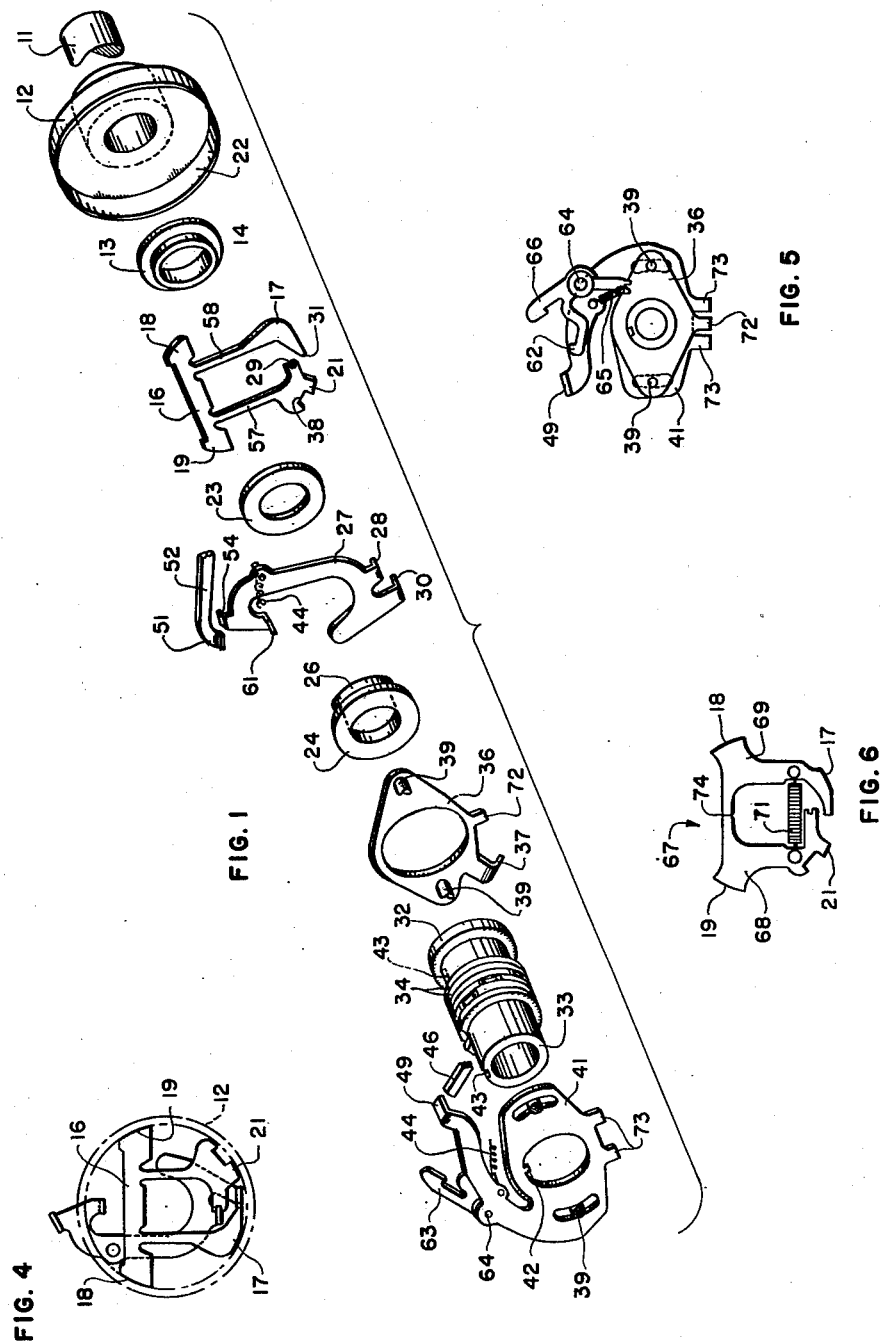

2,568,249

UNITED STATES PATENT OFFICE 2,568,249

LATCH OPERATED CLUTCH

Arthur N. Nilson and Rolf A. Thienemann, Chicago, and Walter J. Zenner, Des Plaines, Ill., assignors to Teletype Corporation, Chicago, Ill., a corporation of Delaware Application November 1, 1946, Serial No. 707,176

15 Claims. (Cl. 192—22)

This invention relates to clutches and more particularly to a high speed clutch designed for use in start-stop telegraph systems.

It is desirable that clutches employed with start-stop telegraph apparatus be rapid and uniform in action and that no slippage occur between the clutch parts during rotation. Such requirements are necessary in order that synchronism be maintained between rotating transmitter and receiver distributors. For example, where a receiver selector magnet is operable in conjunction with a receiver selector cam sleeve, it is advantageous to have a clutch meeting the above requirements so that once the sleeve is oriented with respect to incoming signals, the relationship will be maintained constant. It is apparent that at high signal speeds these requirements are even more exacting.

Single revolution clutches of the friction type, using discs of felt material as clutching elements are commonly employed for controlling the operation of transmitter or receiver cam sleeves in start-stop telegraph systems, as exemplified by the patent of H. L. Krum, No. 1,595,472, dated August 10, 1926. While such clutches may be satisfactory from an operating standpoint at moderate speeds, at high speeds, because of the increased load on the clutch parts, excessive heating and wear is caused, particularly in the rest position of the clutch.

The prime object of the invention is to provide an improved start-stop mechanism, constructed in a manner which insures a high degree of efficiency in operation.

Another object of the present invention is to provide a rapidly and uniformly acting start-stop mechanism particularly designed for high speed operation.

Another object of the present invention is to provide a clutch wherein a relatively small initial operating force is greatly increased to enable the effective engagement of the driving and driven elements of the clutch.

A further object of the invention is to provide a friction clutch wherein a minimum load or drag is placed on the friction engaging means in the rest position on the clutch.

Another object of the invention is to provide in a friction clutch, latching means which prevents relative movement of the driving and driven elements of the clutch during rotation.

Other objects anad advantages of the invention will appear as the clutch is described in more detail.

In attaining the objects of the present invention there is provided a driving drum whose inner periphery is engageable by spaced bearing surfaces of an expansible metallic friction shoe. Operation of the friction shoe is controlled by a clutch lever which is under spring tension in the rest position of the clutch. When the clutch is released the clutch lever is free to move under the spring tension and thereby cause an expansion of the friction shoe enabling its spaced bearing surfaces to engage securely the inner periphery of the drum.

A first multiplication of the initial force exerted by the clutch lever spring is achieved due to the leverage obtained from the length of the clutch lever. The first of two pairs of spaced bearing surfaces of the friction shoe are cut at such an angle that they engage the inner periphery of the drum with a wedging action. The force is thus again multiplied (due to the mechanical principle of the wedge) at this first pair of bearing surfaces, and a multiplied force is also transmitted through connecting webs of the friction shoe to a second pair of spaced bearing surfaces. The second pair of bearing surfaces are also cut at an angle which insures their engagement with the inner periphery of the drum with a wedging action, and consequently again the force is multiplied. It is thus seen that a relatively small initial force exerted by the spring is greatly multiplied.

In the rest position of the clutch, the metallic friction shoe is out of effective engagement with the inner periphery of the drum and exerts negligible drag. It should be further noted that the shoe expands only slightly and with this small movement builds up a high clutching force. There is thus a minimum of motion in the operation of the clutch which is an advantage for quick action. Further, the clutch lever is mounted on a floating pivot, providing a bearing which is antifriction in nature, thereby reducing friction loss of power. Means are also provided for latching up the clutch lever during rotation of the clutch to prevent relative movement between the friction shoe and the drum.

The invention also provides a modified form of friction shoe which is made up of two parts. When the clutch lever is released the parts of the shoe pivot outwardly in opposite directions to engage the driving drum. Otherwise, the two piece friction shoe works on the same principle as the one piece friction shoe.

The invention may be more readily understood by reference to the detailed description which follows when read in conjunction with the drawings in which:

Fig. 1 is an exploded perspective view of the clutch,

Fig. 2 is a vertical sectional view of the clutch taken approximately on the line 2—2 of Fig. 3, Fig. 3 is an elevational view of the clutch, Fig. 4 is a detailed rear view of the friction shoe and the clutch lever, Fig. 5 is a detailed rear view, particularly illustrating the clutch plate and latching lever; and Fig. 6 illustrates a modified form of friction shoe.

With reference to the drawing, the invention will now be described in detail. Numeral 11 represents a driving shaft which for the purpose of this description will be presumed to be constantly rotating. Attached to shaft 11 in any suitable manner is a driving drum 12, and mounted adjacent thereto is a collar 13 having a shoulder portion 14 about which, but out of contact with, is positioned a metallic friction shoe 16. Friction shoe 16, which is in the form of a metallic frame, includes four spaced bearing surfaces 17, 18, 19, and 21, designed to engage the inner periphery 22 of drum 12. Each of the bearing surfaces of the friction shoe 16 are cut at an angle which insures their engagement with the inner periphery 22 of drum 12 with a wedging action.

Alongside of collar 13 is placed a spacer washer 23 against which is mounted a collar 24, having a shoulder 26 about which is placed a clutch lever 27. Clutch lever 27 includes a bent over lug 28 designed to rest partially in a notch 29 of friction shoe 16 and a bent over lug 30 which is in abutting relation with a surface 31 of the friction shoe 16. Resting against collar 24 is a raised annular portion 32 of a cam sleeve 33 carrying a series of cams 34 which may be, for example, cams associated with a receiver selector. Above the raised annular portion 32 of cam sleeve 33 is supported a friction shoe drive plate 36 having a bent over lug 37 designed to rest in a notch 38 of the friction shoe 16. Adjustably connected to plate 36 by means of screw and slot connections 39 is a clutch driving plate 41 having a fixed relationship with cam sleeve 33 by reason of the engagement of its depending lug 42 in key way 43 of cam sleeve 33.

Extending between clutch lever 27 and clutch driving plate 41 is a spring 44 which in the rest position of the clutch is distended. At this time the free end of lever 46 which is pivoted at 47 and normally urged in a counterclockwise direction (Fig. 3) by spring 48, rests against projection 49 of clutch driving plate 41. This prevents backing up of the clutch. Also at this time a projection 51 of armature lever 52 which is urged in a clockwise direction by spring 53 about the pivot 47 is in a position engaging projection 54 of the clutch lever 27. Thus, in the rest position of the clutch, levers 46 and 52 function to hold spring 44 under tension.

When selector magnet 56 becomes de-energized upon receipt of a no current start impulse, spring 53 pivots armature lever 52 in a clockwise direction, moving its projection 51 out of the path of projection 54 of clutch lever 27. This enables the contraction of spring 44 and causes clutch lever 27 in a floating pivotal movement to rock in a counterclockwise direction to press its lug 28 against notch 29 of friction shoe 16 and further causes its projection 30 to press against the surface 31 of friction shoe 16. This wedges the bearing surfaces 17 and 21 securely against the inner periphery 22 of drum 12 in opposite directions. The friction shoe 16 is now spread slightly and the thin connecting webs 57 and 58 are moved in opposite outward directions causing bearing surfaces 18 and 19 also to engage securely the inner periphery 22 of drum 12 with a wedging action.

Assuming now that spring 44 has a relatively small initial operating force, movement of the relatively long clutch lever 27 causes its lug 28 to press against notch 29 of friction shoe 16 with an increased force due to leverage and similarly enables its lug 30 to press against surface 31 of friction shoe 16 with an increased degree of force. The wedging action of the first pair of bearing surfaces 17 and 21 against the inner periphery 22 of the drum multiplies this increased force at their engaging points and also multiplies the force transmitted along each connecting web 57 and 58 of the friction shoe 16. As bearing surfaces 18 and 19 engage the inner periphery 22 of drum 12, the forces transmitted along webs 57 and 58 again are multiplied causing the engagement of the surfaces 18 and 19 with the inner periphery of the drum with another increased force. Further, the direction of rotation of the parts is such that the inner periphery 22 of the drum 12 tends to further expand the shoe, again increasing the force at the bearing surfaces 17, 18, 19, and 21.

In operation of the clutch, after clutch lever 27 expands the friction shoe 16, there is a tendency for the clutch lever to rebound and oscillate. Since this oscillation might result in relative movement between the friction shoe 16 and driving drum 12, the clutch latching mechanism now to be described is provided in the invention. When the clutch lever 27 pivots in a counterclockwise direction (as viewed in Fig. 3), its lug 61 engages the shoulder 62 of a latching lever 63 which is pivoted on the plate 41 at 64 and normally urged in a counterclockwise direction by a spring 65. This latches the clutch lever 27 to the plate 41 and prevents relative movement between the friction shoe 16 and the drum 12 during rotation of the clutch parts.

When the clutch nears the end of a revolution, selector magnet 56 is at this time receiving a marking or current impulse thereby placing projection 51 of armature lever 52 in the path of upwardly extending arm 66 of latch lever 63, causing it to pivot in a clockwise direction (as viewed in Fig. 3) thereby unlatching clutch lever 27. Shortly thereafter, projection 54 of clutch lever 27 strikes projection 51 of the armature lever 52 limiting further movement of lever 27. Clutch plate 41, however, continues to move under momentum and lever 46 falls in back of projection 49 as it strikes the rear of projection 54 and rebounds slightly, thereby again placing spring 44 under tension ready for the next operation.

Fig. 6 shows a modified form of friction shoe 67 which operates in a manner similar to friction shoe 16. In this case the shoe is made up of two parts, 68 and 69, which are connected together by a spring 71, the only function of which is to hold the parts together in the clutch assembly. When shoe 67 is operated by clutch lever 27, parts 68 and 69 pivot in opposite outward directions at the point 74 to effect the engagement of the friction shoe 67 with the drum 12. The principle of operation is otherwise the same as was described in connection with the operation of one piece shoe 16.

The pin and screw connections 39 are provided between plates 36 and 41 in order to provide an adjusting means for taking up wear on the friction shoe 16. Projection 72 is provided on plate 36 and projections 73 are provided on plate 41 so that a tool may be inserted into the clutch to move plates 36 and 41 relative to each other to make necessary adjustments.

It is understood that while the invention has been described as being particularly adaptable for use in start-stop telegraph systems that it may have many other applications both in and outside the field of telegraphy. Various changes and modifications may be made in the invention without departing from the spirit and scope thereof.

What is claimed is:

1. In a clutch, driving means, driven means including a first pair of spaced surfaces for engaging said driving means, a second pair of spaced surfaces for engaging said driving means, operating means for enabling said first and second pair of surfaces to engage said driving means and effect rotation of said driven means with said driving means, said first pair of surfaces being designed to engage said driving means with a force greater than the initial operating force, and means for multiplying said greater force at said first pair of bearing surfaces and for transmitting a multiplied force to said second pair of surfaces, said second pair of surfaces being designed to again multiply the force transmitted from the first pair of bearing surfaces.

2. In a clutch, driving means, driven means including a first pair of wedging surfaces for engaging said driving means, a second pair of wedging surfaces for engaging said driving means, and operating means for enabling the engagement of said first pair of wedging surfaces with said driving means and said first pair of wedging surfaces cooperating with said driving means for enabling the engagement of said second pair of wedging surfaces with said driving means to thereby effect rotary movement of said driven means with said driving means.

3. In a clutch, driving means including a drum, driven means including an expansible frame having a first and second pair of wedging members for engaging said drum, and operating means for transmitting a force to said frame for expanding said frame, said first pair of wedging members being designed to engage said drum with a force greater than the force transmitted by said operating means and to transmit also a force to said second pair of wedging members greater than the force transmitted by said operating means, said second pair of wedging members being designed to engage said drum with a force greater than the force transmitted from said first pair of wedging members.

4. In a clutch, driving means, driven means including a plurality of wedging members for engaging said driving means, operating means for providing a force against said wedging members for enabling their engagement with said driving means to effect rotary movement of said driven means with said driving means, at least one of said wedging members being designed to engage said driving means with a force greater than the force provided by said operating means and to transmit also a force to one other of said wedging members greater than that force provided by said operating means, said last mentioned wedging member being designed to engage said driving means with a force greater than the force transmitted from the wedging member operable by a force received from said operating means.

5. In a clutch, driving means including a drum, driven means including an expansible frame having a first and second pair of wedging members for engaging said drum and an operating lever for transmitting a force to said frame for expanding said frame and thereby effecting rotation of said driven means with said driving means, said first pair of wedging members being designed to engage said drum with a force greater than the force transmitted by said operating lever and to transmit also a force to said second pair of wedging members greater than that force transmitted by said operating lever, said second pair of wedging members being designed to engage said drum with a force greater than the force transmitted from said first pair of wedging members.

6. In a clutch, driving means including a drum, driven means including a two part frame having a first and second pair of wedging members for engaging said drum, and operating means for transmitting a force to said frame for moving each of said parts of said frame in opposite directions, said first pair of wedging members being designed to engage said drum with a force greater than the force transmitted by said operating means and to transmit also a greater force to said second pair of wedging members, said second pair of wedging members being designed to engage said drum with a force greater than the force transmitted from said first pair of wedging members.

7. In a clutch, driving means including a drum, driven means including a two part frame having a first and second pair of wedging members for engaging said drum, and an operating lever for transmitting a force and thereby moving said parts of said frame in opposite directions, said first pair of wedging members being designed to engage said drum with a force greater than the force transmitted by said operating lever and to transmit also a greater force to said second pair of wedging members, said second pair of wedging members being designed to engage said drum with a force greater than the force transmitted from said first pair of wedging members.

8. In a clutch, driving means including a drum, driven means including an expansible frame having a first and second pair of wedging members for engaging said drum, an operating lever for transmitting a force to said frame for expanding said frame and thereby effecting rotation of driven means with said driving means, said first pair of wedging members being designed to engage said drum with a force greater than the force transmitted by said operating lever and to transmit also a force to said second pair of wedging members greater than the force transmitted by said operating lever, said second pair of wedging members being designed to engage said drum with a force greater than the force transmitted from said first pair of wedging members, and means for latching said operating lever to said driven means to prevent relative movement between said driving and driven means during rotation.

9. In a clutch, driving means including a drum, driven means including a two part frame having a first and second pair of wedging members for engaging said drum, and an operating lever for transmitting a force to said frame for moving said parts of said frame in opposite directions, said first pair of wedging members being designed to engage said drum with a force greater than the force transmitted by said operating lever and to transmit also a greater force to said second pair of wedging members, said second pair of wedging members being designed to engage said drum with a force greater than the force transmitted from said first pair of wedging members, and means for latching said operating lever to said driven means to prevent relative movement between said driving and driven means during rotation.

10. In a clutch, driving means, driven means including a plurality of engaging surfaces, and operating means for exerting a force to thereby enable said engaging surfaces to engage said driving means and effect rotation of said driven means, a first one of said engaging surfaces being designed to engage said driving means with a force greater than said force exerted by said operating means and to transmit a force greater than the force exerted by said operating means to a second one of said engaging surfaces, said second one of said engaging members being designed to engage said driving means with a force greater than the force transmitted from said first one of said engaging surfaces.

11. In a clutch, driving means, driven means including a plurality of groups of engaging members for engaging said driving means, and operating means for exerting a force against said engaging members for enabling said engaging members to engage said driving means to effect rotation of said driven means with said driving means, a first group of said plurality of groups of engaging members engaging said driving means with a force greater than the force exerted by said operating means and transmitting a force to a subsequent group of said plurality of groups of engaging members greater than the force exerted by said operating means, said subsequent group of said plurality of groups of engaging members engaging said driving means with a force greater than that received from said first group of engaging members.

12. In a clutch, drive means, driven means, a plurality of engaging means on said driven means for engaging said drive means, and operating means for exerting a force against a first one of said engaging means, said first engaging means cooperating with said drive means in a wedging manner to multiply the force exerted by said operating means, said first engaging means cooperating with said second engaging means whereby the multiplied force is transmitted to a second one of said engaging means.

13. In a clutch, drive means, driven means, a plurality of engaging members on said driven means for engaging said drive means, and operating means for exerting a force to wedge a first one of said engaging members against said drive means, said first engaging member cooperating with said drive means upon the wedging thereof against said drive means to multiply the force exerted by said operating means, said first engaging member being further effective to transmit the multiplied force to a second one of said engaging members, said second one of said engaging members being effective to wedge against said drive means with said multiplied force.

14. In a clutch, drive means, driven means, a plurality of engaging means on said driven means for engaging said drive means, and operating means for exerting a force against a first group of said engaging means, said first group of engaging means engaging with said drive means in a wedging manner and cooperating therewith to multiply the force exerted by said operating means, whereby said first group of engaging means transmits the multiplied force to a second group of said engaging means, said second group of engaging means being effective to engage said drive means in a wedging manner with said multiplied force.

15. A friction clutch including a driving member, a driven member, means associated with said driven member and having a first group and a second group of spaced bearing surfaces for engaging said driving member, operating means associated with said first mentioned means for enabling the engagement of said first group of bearing surfaces with said driving member at one force, said first group of bearing surfaces engaging said driving member in a wedging manner to multiply the first force, said first group of bearing surfaces being effective to transmit the multiplied force to said second group of bearing surfaces to enable said second group of bearing surfaces to engage said driving member with an increased degree of force, means for restraining said operating means from operation in the rest position of said clutch, and means for releasing said restraining means to thereby enable engagement of all of said bearing surfaces with said driving member and consequent rotation of the clutch.

ARTHUR N. NILSON.
ROLF A. THIENEMANN.
WALTER J. ZENNER.

REFERENCES CITED

The following references are of record in the file of this patent:

UNITED STATES PATENTS

| Number | Name | Date |
|---|---|---|
| 354,242 | Salomon | Dec. 14, 1886 |
| 453,810 | Howe | June 9, 1891 |
| 865,154 | Bachman et al. | Sept. 3, 1907 |
| 1,422,062 | Hunt | July 4, 1922 |
| 1,800,072 | Hight | Apr. 7, 1931 |
| 2,045,572 | Dow | June 30, 1936 |
| 2,249,281 | Wellman | July 15, 1941 |
| 2,273,496 | Perry | Feb. 17, 1942 |